(No Model.)
C. REUTER & G. BOLLMANN.
ELECTRIC TELL-TALE FOR TANKS.
No. 467,774. Patented Jan. 26, 1892.
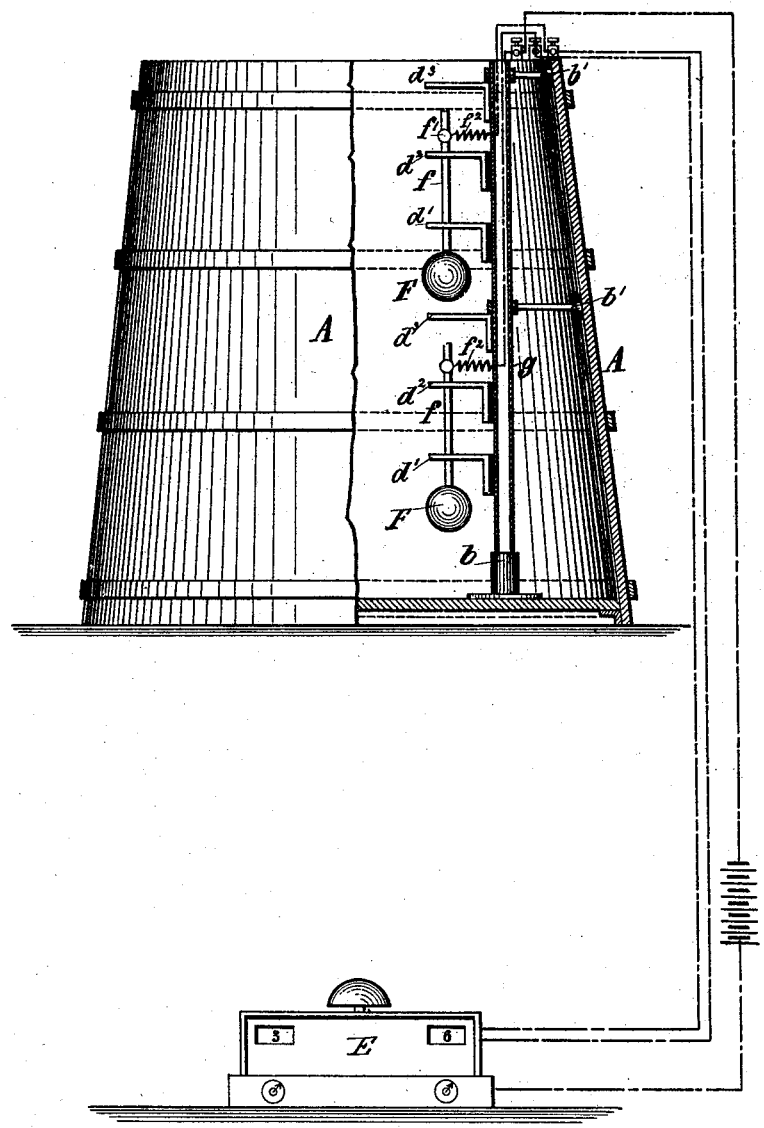

UNITED STATES PATENT OFFICE.

CHARLES REUTER AND GEORGE BOLLMANN, OF BROOKLYN, NEW YORK.

ELECTRIC TELL-TALE FOR TANKS.

SPECIFICATION forming part of Letters Patent No. 467,774, dated January 26, 1892.

Application filed June 19, 1891. Serial No. 396,830. (No model.)

*To all whom it may concern:*

Be it known that we, CHARLES REUTER and GEORGE BOLLMANN, citizens of the United States, residing in the city of Brooklyn, in the county of Kings and State of New York, have invented certain new and useful Improvements in Electric Tell-Tales for Tanks, of which the following is a specification.

This invention relates to an improved electric tell-tale for water and other tanks, by means of which the quantity of water or other liquid in the tank is automatically announced to the engineer as the tank is filling, so that he can stop the pump and prevent the overflow of the tank; and the invention consists of the combination, with a tank, of an upright standard attached to said tank, brackets on said standard, a float the stem of which is guided in said brackets, and a bracket above the stem of the float, with which said stem forms electric contact when the water in the tank has risen to the required level, said float and standard being connected with a suitable annunciator and alarm device by which the level of the water in the tank is automatically indicated on the closing of the circuit.

The accompanying drawing represents a sectional side elevation of my improved electric tell-tale for tanks and its connection with the annunciator and alarm and electric battery.

In the drawing, A represents a tank of suitable construction, such as is used for storing water on the roofs of apartment-houses, breweries, factories, &c., and distributing the same from the tank over the building.

B is an upright standard that is supported by a socket $b$ on the bottom of the tank and by bracket-arms $b'$ $b'$, attached to the wall of the tank, said standard being preferably made of gas-pipe. To the upright standard B are attached three bracket-arms $d'$ $d^2$ $d^3$, of which the lower arms $d'$ and $d^2$ are insulated from the standard B by means of interposed plates of hard rubber or other suitable non-conductor of electricity, while the bracket $d^3$ is attached directly to the standard, so as to be in electric connection therewith. The horizontal portions of the brackets $d'$ $d^2$ are perforated so as to serve as guides for the stem $f$ of a float F, the upper end of which is connected by a binding-post $f'$ and a flexible wire $f^2$ with a conducting-wire $g$, that extends along the interior of the standard B to a binding-post $e$ at the upper end of the tank. The bracket $d^3$ serves to form contact with the upper end of the stem $f$ of the float F when the same has been raised to sufficient height by the level of the water in the tank. The standard B is also connected by a wire $g'$ with a binding-post at the upper part of the tank A, both binding-posts $e$ and $e'$ being connected by wires with a battery and an annunciator E and alarm-bell arranged in the circuit of the battery. In the tank A are preferably arranged several floats at different heights, one above the other, which work in connection with corresponding contact-brackets $d^3$, attached to the standard B. The annunciator E is provided with a corresponding number of indicators which are successively operated as the level of the water in the tank rises and the contact of the stem of one float after the other with their brackets $d^3$ is made. When the water in the tank rises to a height of three feet, the first indicator is dropped by the contact of the stem of the first float with its contact-plate $d^3$, so that the circuit is closed and not only the indicator dropped, but the magneto-bell operated, which continues to ring until by the setting of a switch by the engineer the circuit is again interrupted. When the water rises to a height of six feet in the tank, the next float is raised and the contact of its stem with the contact-bracket $d^3$ produced, so that the circuit is again closed and the six-foot indicator dropped and the alarm sounded until it is switched out again. In this manner the height of the water-level in the tank is readily indicated to the engineer who attends to the pumps, so that the same has thereby full control of the tank, whereby overflows are effectively prevented.

Having thus described our invention, we claim as new and desire to secure by Letters Patent—

1. An electric tell-tale for tanks, consisting of an upright standard supported in said tanks, guide-brackets insulated from said tanks, a float the stem of which is guided by said brackets, a contact-bracket attached to said standard above the stem, and electric connections between the stem of the float and the contact-bracket, so that the height of the water-level in the tanks is indicated in a suitable manner, substantially as set forth.

2. An electric tell-tale for tanks, composed of an upright tubular standard supported in said tanks, guide-brackets attached to said standard and separated by suitable insulating material from the same, a float the stem of which is guided in said brackets, a contact-bracket attached to the standard above the stem of the float, an annunciator, and alarm-bell and electric connections between the stem of the float-standard and the annunciator and alarm-bell, so as to indicate the height of the water in the tanks by the closing of the circuit, substantially as set forth.

In testimony that we claim the foregoing as our invention we have signed our names in presence of two subscribing witnesses.

CHARLES REUTER.
GEORGE BOLLMANN.

Witnesses:
OSCAR F. GUNZ,
A. M. BAKER.